US006946071B2

(12) United States Patent
Ehara et al.

(10) Patent No.: US 6,946,071 B2
(45) Date of Patent: Sep. 20, 2005

(54) FUEL FEEDING DEVICE AND FUEL FILTER USED FOR THE DEVICE

(75) Inventors: Ryoji Ehara, Odawara (JP); Junichiro Takahashi, Odawara (JP); Shogo Hashimoto, Odawara (JP)

(73) Assignee: Mikuni Corporation, Tokyo (JP)

( * ) Notice: Subject to any disclaimer, the term of this patent is extended or adjusted under 35 U.S.C. 154(b) by 35 days.

(21) Appl. No.: 10/380,824

(22) PCT Filed: Sep. 17, 2001

(86) PCT No.: PCT/JP01/08054

§ 371 (c)(1),
(2), (4) Date: Nov. 18, 2003

(87) PCT Pub. No.: WO02/25095

PCT Pub. Date: Mar. 28, 2002

(65) Prior Publication Data

US 2004/0065305 A1 Apr. 8, 2004

(30) Foreign Application Priority Data

Sep. 20, 2000 (JP) ....................................... 2000-284638

(51) Int. Cl.[7] ....................... F02M 37/22; B01D 35/027
(52) U.S. Cl. ..................... 210/416.4; 210/436; 210/472
(58) Field of Search .............................. 210/167, 416.1, 210/416.4, 436, 459, 472; 123/495, 509

(56) References Cited

U.S. PATENT DOCUMENTS 1,249,939 A * 12/1917 Falwell ....................... 417/133
3,239,064 A * 3/1966 White ........................ 210/436
5,186,152 A * 2/1993 Cortochiato et al. ........ 123/514
5,192,430 A * 3/1993 Mohr ......................... 210/172
5,584,988 A * 12/1996 Hashimoto et al. ......... 210/136
6,533,932 B1 * 3/2003 Kallberg et al. ............ 210/232

FOREIGN PATENT DOCUMENTS

| | | |
|---|---|---|
| JP | 58-20373 | 2/1983 |
| JP | 59-84264 | 6/1984 |
| JP | 61-184861 | 11/1986 |
| JP | 63-170571 | 11/1988 |
| JP | 4-19659 | 2/1992 |
| JP | 5-157014 | 6/1993 |
| JP | 11-141438 | 5/1999 |

* cited by examiner

*Primary Examiner*—Fred G. Prince
(74) *Attorney, Agent, or Firm*—Wenderoth, Lind & Ponack, L.L.P.

(57) ABSTRACT

The present device is a fuel supply device to pressurize and supply fuel F which is stored in a fuel tank 10, which comprises a fuel supply pipe 11 which forms a supply passage for the fuel F, a fuel filter 12 to filter the fuel F disposed at the midway of the fuel pipe 11 and below the fuel tank 10, a fuel pump 13 to pressure-feed the fuel F disposed at the downstream side than the fuel filter 12, and a venting pipe 15 to connect the downstream side of the fuel filter 12 and an upper air-space A of the fuel tank 10. The object is to provide the fuel supply device and the fuel filter utilized for the fuel supply device which can ensure the discharging amount of the fuel pump by satisfactory removing of vapor which is generated in the fuel sucked to the fuel pump.

3 Claims, 8 Drawing Sheets

FUEL FEEDING DEVICE AND FUEL FILTER USED FOR THE DEVICE

TECHNICAL FIELD

The present invention relates to a fuel supply device and a fuel filter, and especially relates to a fuel supply device that pressurizes fuel and supplies the fuel as fine particles to an internal combustion engine, and a fuel filter that is utilized for this fuel supply device.

BACKGROUND ART

Conventionally, the structure shown in FIG. 8 is well-known as this kind of fuel supply device. With this fuel supply device, fuel F which is stored in a fuel tank 1 is introduced to a fuel pump 3 through a fuel filter 2 by which the fuel F is filtered. The fuel F is atomized and injected to an intake pipe or a combustion chamber of an internal combustion engine by a fuel injection nozzle 4 while the fuel F is pressurized to or over a specific pressure by the fuel pump 3 and supplied to the fuel injection nozzle 4.

In this figure, the numerical 5 is a pressure regulator which is disposed between the fuel pump 3 and the fuel injection nozzle 4, and regulates the pressure of the fuel F that is supplied to the fuel injection nozzle to a specific pressure. The pressure of the fuel F is regulated by returning excess fuel F to the fuel tank 1 through a return pipe 6.

Furthermore, the inside of the fuel filter 2 is divided by a filter member (a filter paper etc.) 7 into two rooms which are the upstream side and the downstream side, namely, upstream room 8 and downstream room 9.

Here, with this sort of conventional fuel supply device, following problems remain to be solve.

With the aforementioned conventional fuel supply device, the upstream room 8 of the fuel filter 2 is connected to the inside of the fuel tank 1 which is located above and is filled up with the fuel F, so as to receive pressure head equivalent to the fuel level height of the fuel F in the fuel tank 1.

Meanwhile, the fuel F in the downstream room 9 is sucked by the fuel pump 3 to result the pressure of the downstream room 9 to be lower than that of the upstream room 8.

Vapor is generated in the fuel F due to the depression at the time when the fuel F is moved by the pressure balance from the upstream room 8 to the downstream room 9, or due to heating of the fuel F in the fuel supply passage by the environmental temperature increase.

In this manner, when vapor is generated in the fuel F, all the vapor is sucked to the fuel pump 3. When the amount of the vapor excesses the discharging capacity of the fuel pump 3, the fuel discharging amount of the fuel pump 3 is insufficient.

The present invention is devised in the light of such conventional problems. The purpose of the present invention is to provide a fuel supply device and a fuel filter that is utilized to the fuel supply device, which can ensure the fuel discharging amount of the fuel pump by satisfactory removing of vapor which is generated in the fuel sucked by the fuel pump.

SUMMARY OF THE INVENTION

To achieve the aforementioned object, the present invention of is a fuel supply device to pressurize and supply fuel stored in a fuel tank, and comprises a fuel supply pipe that forms a supply passage for the fuel, a fuel filter to filter the fuel supply pipe that forms a supply passage for the fuel, a fuel filter to filter the fuel disposed at a midway point of the fuel supply pipe and below the fuel tank, a fuel pump to pressure-feed the fuel disposed at the downstream side of the fuel filter, and a venting pipe to connect the downstream side of the fuel filter and an upper air-space of the fuel tank.

According to an aspect of the present invention, suction portion of the fuel pump is disposed below a fuel discharge portion of the fuel filter.

According to a further aspect of the present invention, the fuel supply device further comprises a pressure regulator disposed in the fuel pipe at a downstream side of the fuel pump to adjust the pressure of the fuel discharged from the fuel pump, and a return pipe disposed at the pressure regulator to return surplus fuel to the fuel tank, wherein the return pipe communicates with a midway point of the venting pipe at a position above the pressure regulator.

According to another aspect of the present invention, the return pipe is connected to the venting pipe so that the angle which the return pipe forms with the venting is upwardly acute.

According to yet another aspect of the present invention, the fuel filter comprises a fuel filter main body, a filter member which divides the inside of the filter main body into an upstream chamber and a downstream chamber, a suction joint disposed at the upstream chamber of the fuel filter main body to communicate with the fuel tank, a supply joint disposed at the lower part of the downstream chamber of the fuel filter main body to communicate with the fuel pump, and a circulating joint disposed at the upper part of the downstream chamber of the fuel filter to communicate with an upper air-space of the fuel tank.

According to yet another aspect of the present invention, a return joint to which the return pipe of the pressure regulator is connected is disposed at the According to still another aspect of the present invention, the return joint is connected to the circulating joint so that the angle which the return joint forms with the circulating joint is upwardly acute.

DETAILED DESCRIPTION OF THE INVENTION

Next, an embodiment of the present invention is explained with reference to FIG. 1 through FIG. 3.

Figure 1:
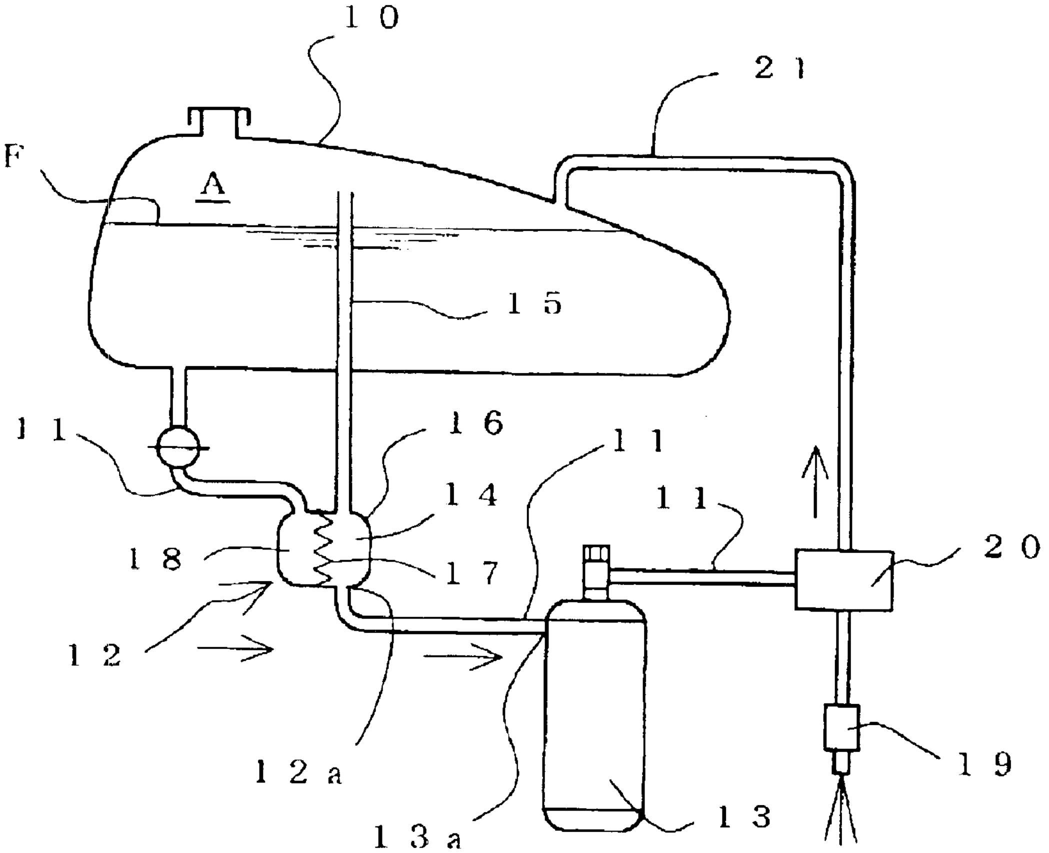
FIG. 1 is a system schematically showing an embodiment of the present invention.
Figure 2:
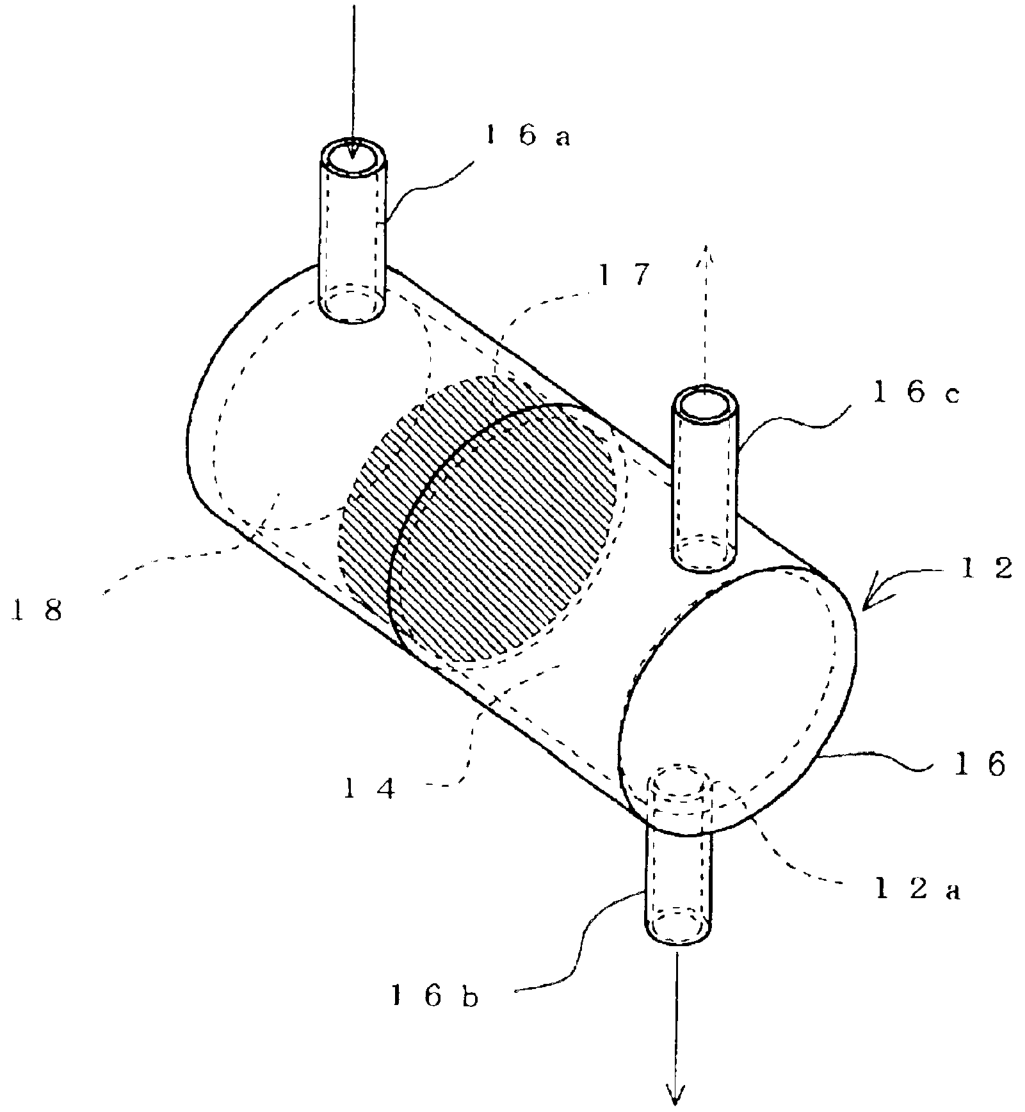
FIG. 2 is an external perspective view of a fuel filter showing an embodiment of the present invention.

FIG. 1 shows a general structure of a fuel supply device to pressurize and supply fuel F which is stored in a fuel tank 10, which comprises a fuel supply pipe 11 that forms a supply passage for the fuel F, a fuel filter 12 to filter the fuel F disposed at the midway point of the fuel pipe 11 and below the fuel tank 10, a fuel pump 13 to pressure-feed the fuel F disposed at the downstream side of the fuel filter12, and a venting pipe 15 to connect the downstream side (the downstream room 14) of the fuel filter 12 and an upper air-space A of the fuel tank 10.

Next, it is explained precisely. As shown in FIG. 2 and FIG. 3, the fuel filter 12 consists of a fuel filter main body 16 and a filter member (a filter paper etc.) 17 which divides the fuel filter main body into an upstream chamber 18 and downstream room 14.

The upstream room 18 communicates with a bottom portion of the fuel tank 10 through a suction joint 16*a* disposed at the upper part of the fuel filter main body 16, and a part of the fuel supply pipe 11 connected to the suction joint 16*a*. The downstream room 14 communicates with a suction portion 13*a* of the fuel pump 13 through a supply joint 16*b* disposed at a fuel discharge portion 12*a* of a bottom portion of the fuel filter main body 16, and a part of the fuel supply pipe 11 connected to the supply joint 16*b*.

Further, a circulating joint 16*c*, to which the venting pipe 15 connects, is disposed upwardly at the upper part of the downstream room 14. The venting pipe 15 pierces the bottom portion of the fuel tank 10 and is inserted to the inside, so that the upper end portion locates at the upper air-space A.

The fuel pump 13 is disposed so that the suction portion 13*a* is positioned below the fuel discharge portion 12*a* of the fuel filter 12.

Meanwhile, in FIG. 1, numeral 19 shows a fuel injection nozzle which atomizes and injects the fuel F, has been pressure fed to the fuel injection nozzle 19 by the fuel pump 13, into an intake pipe of a combustion chamber of an internal combustion engine (not shown in figures). A pressure regulator 20, which regulates the fuel F supplied to the fuel injection nozzle 19 to a specific pressure, is disposed at the midway of the fuel supply pipe 11 which connects the fuel injection nozzle 19 and the fuel pump 13.

The pressure regulator 20 regulates the pressure of the fuel F supplied by the fuel pump, by returning excess amount of the fuel F to the fuel tank 10 through the return pipe 21.

Next, the operation of the embodiment of the fuel supply device is explained.

After the fuel pump 13 is activated to supply the fuel F to an internal combustion engine, the fuel F in the fuel tank 10 flows into the upstream chamber 18 of the fuel filter 12 by its weight. The fuel F filtered by the filter member 17 flows into the downstream chamber 14 and is sucked to the fuel pump 13 which is disposed below.

The fuel F sucked to the fuel pump 13 as described above is pressurized by the fuel pump 13 to or over a specific pressure, and is supplied to the fuel injection nozzle 19 after its pressure is regulated by the pressure regulator 20, and is atomized and injected to an intake pipe or a combustion chamber of an internal combustion engine by the fuel injection nozzle 19.

During such a supply process of the fuel F, vapor is generated in the fuel F because the fuel F in the fuel tank 10 and the fuel filter 12 is heated by the effect of the environmental temperature, or because the pressure of the fuel F is reduced when it passes through the filter member 17.

Figure 3:
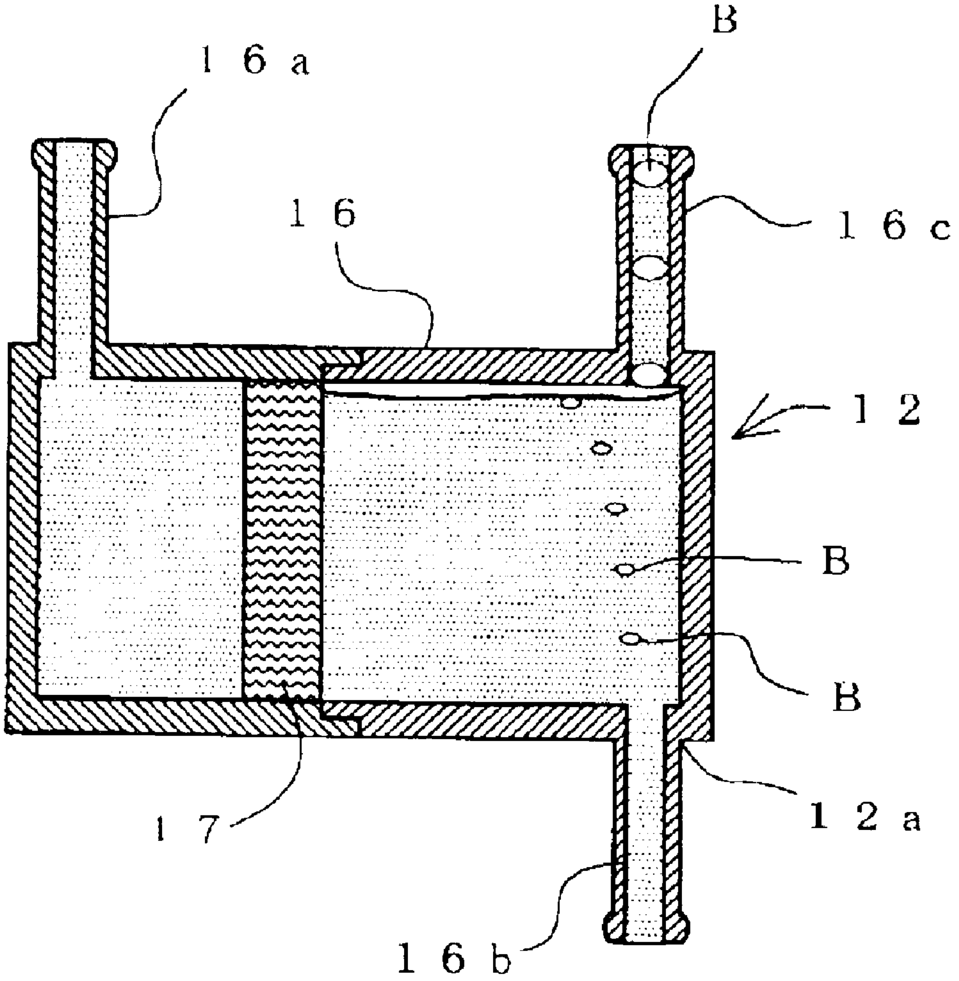
FIG. 3 is a longitudinal cross-sectional view of a fuel filter showing an embodiment of the present invention.

The vapor B generated as described above is introduced into the downstream chamber 14 of the fuel filter 12, and gathers at its upper area, as shown in FIG. 3.

Here, in this embodiment, as the venting pipe 15 is connected to the upper area of the downstream chamber 14 through the circulating joint 16*c*, the vapor moves upwards with its buoyancy in the circulating joint 16*c* and the venting pipe 15.

An air-lift pump is structured with the circulating joint 16*c* and venting pipe 15 where such movements of the vapor B occur, and by this pump, the vapor B is discharged to the upper air-space A of the fuel tank 10.

Furthermore, because the suction portion 13*a* of the fuel pump 13 is disposed below the discharge portion 12*a* of the fuel filter 12, the vapor generated at the vicinity and the inside of the fuel pump 13 is discharged, due to its buoyancy, to the fuel tank 10 through the downstream chamber 14 and the venting pipe 15.

Therefore, the amount of the vapor B, which is mixed in the fuel F sucked to the fuel pump 13, is greatly reduced so that the degradation of the fuel feeding (discharging amount) of fuel pump 13 is prevented.

Figure 4:
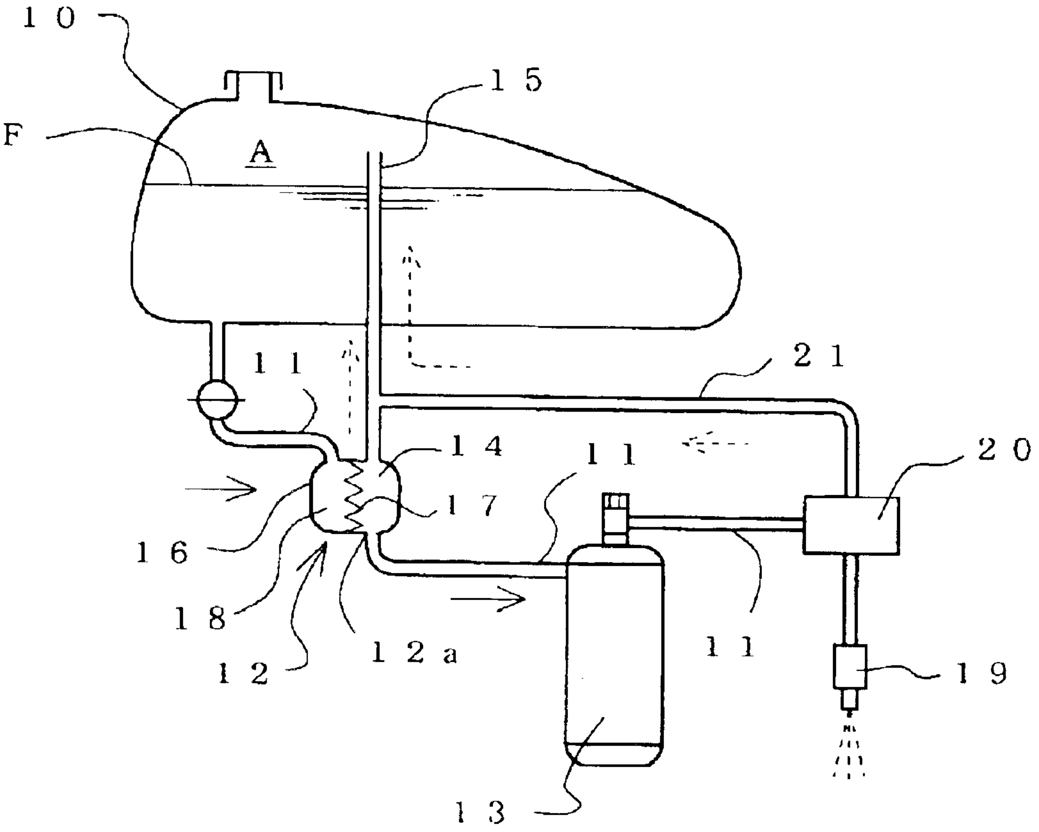
FIG. 4 is a system schematic showing the second embodiment of the present invention.
Figure 5:
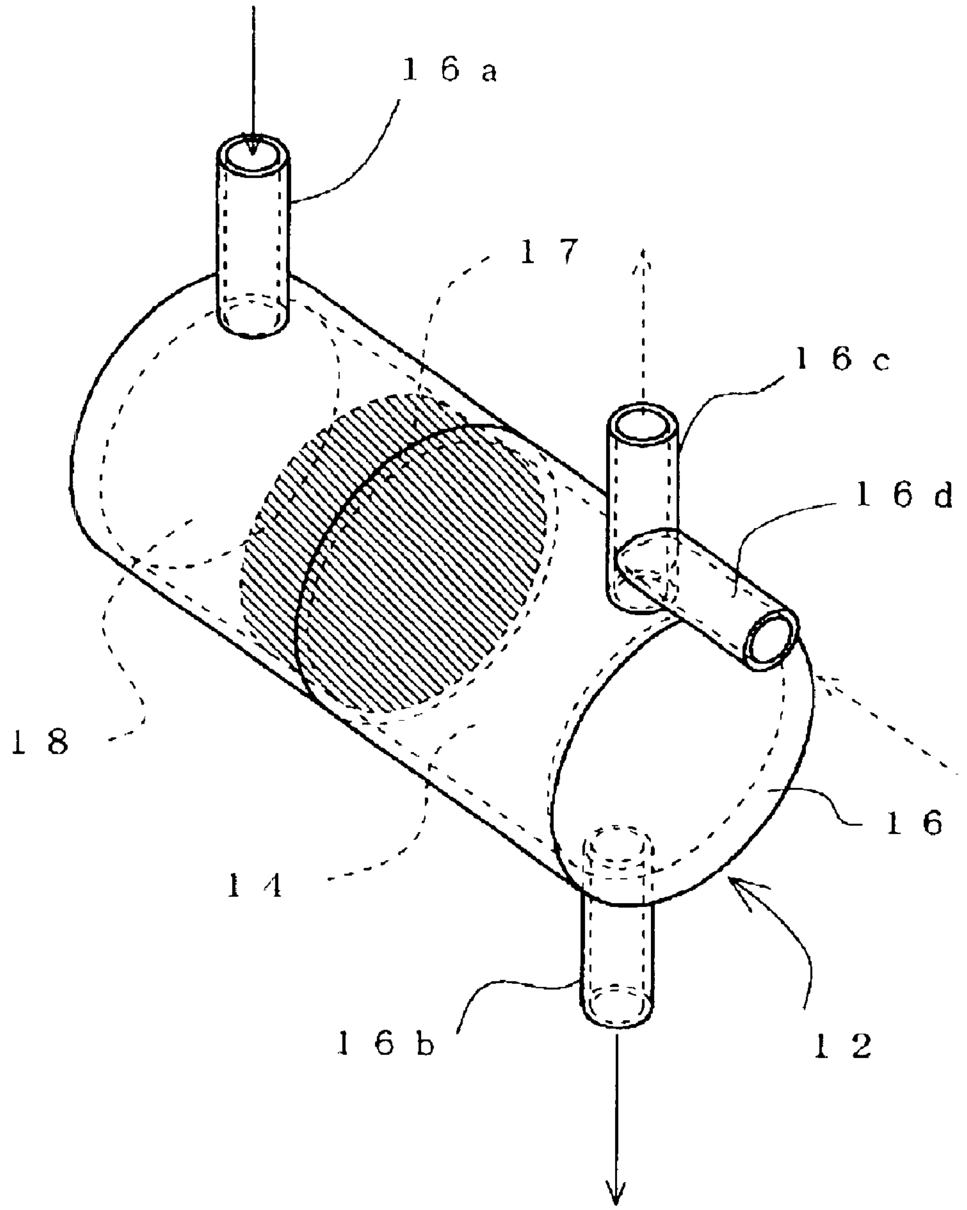
FIG. 5 is an external perspective view of a fuel filter showing the second embodiment of the present invention.
Figure 6:
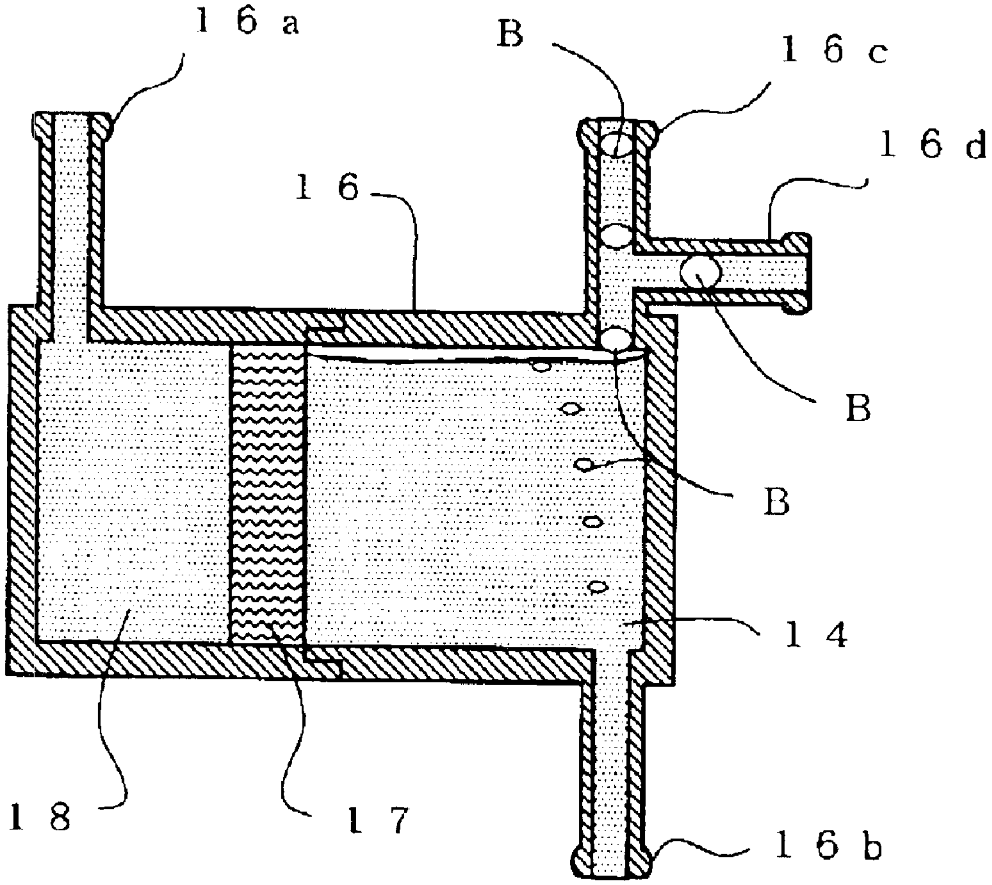
FIG. 6 is a longitudinal cross-sectional view of a fuel filter showing the second embodiment of the present invention.

Next, the second embodiment of the present invention is explained with reference to FIG. 4 through FIG. 6.

The fuel supply device of the embodiment is characterized in that the return pipe 21 is connected to the midway of the venting pipe 15 above the pressure regulator 20, and the rest of the structure is the same as those of the aforementioned embodiment.

Specifically, the return joint 16*d* is disposed horizontally at the vicinity of the lower end portion of the circulating joint 16*c*. The top end portion of the return pipe 21 is connected to the return joint 16*d*, so as to be approximately orthogonal to the venting pipe 15 and to be approximately horizontal.

In this structure, the vapor B in the fuel F, which is discharged from the pressure regulator 20, is introduced to the venting pipe 15 with the excess fuel F and returned to the fuel tank 10 through the venting pipe 15.

Then, as the excess fuel F flows into the venting pipe 15 and moves upwards, vapor B and a part of fuel F, which flow into the venting pipe 15 from the fuel filter 12, are entangled to be sucked so that the discharge of the vapor in the downstream chamber 14 is expedited.

Therefore, the degradation of the fuel pump 13 in feeding capacity is further prevented.

Incidentally, shapes and dimensions etc. shown in the aforementioned embodiments are just examples, and are capable to be changed variously based on design requirements and so on.

For example, it is possible to connect the return pipe 21 to the venting pipe 15 so that the angle which the return pipe 21 forms with the venting pipe 15 is upwardly acute.

Figure 7:
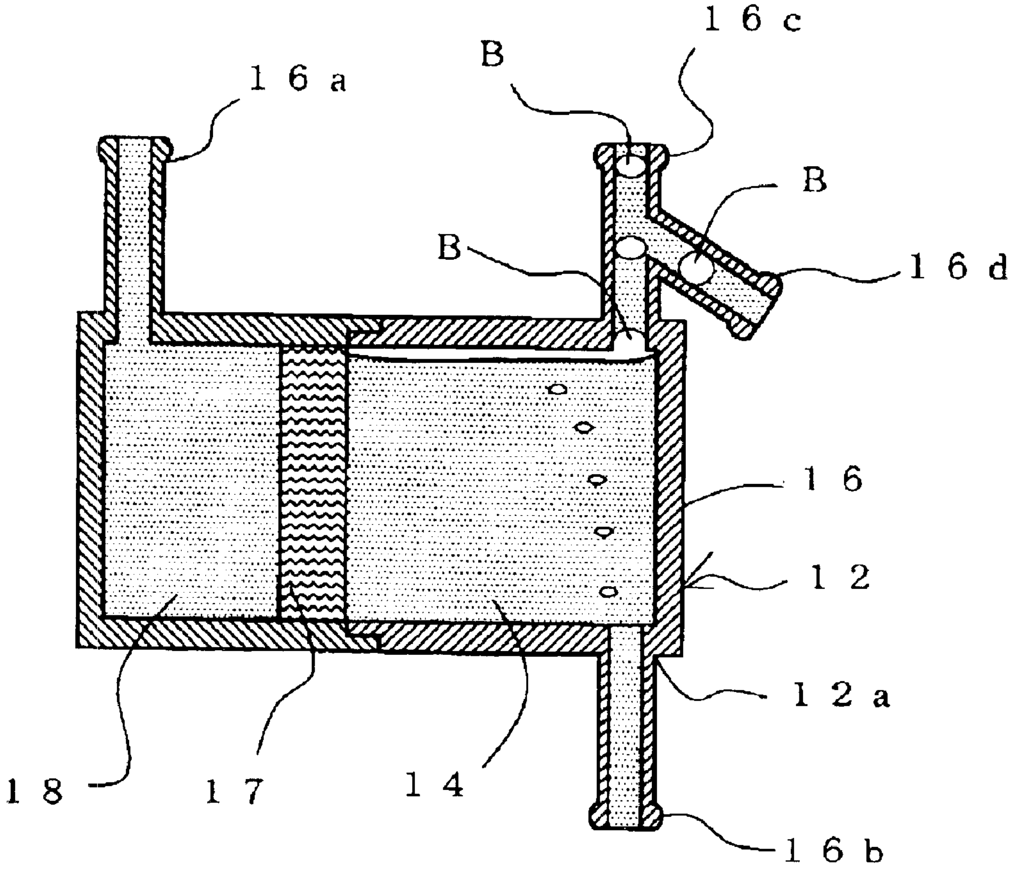
FIG. 7 is a longitudinal cross-sectional view of a fuel filter showing another embodiment of the present invention.
Figure 8:
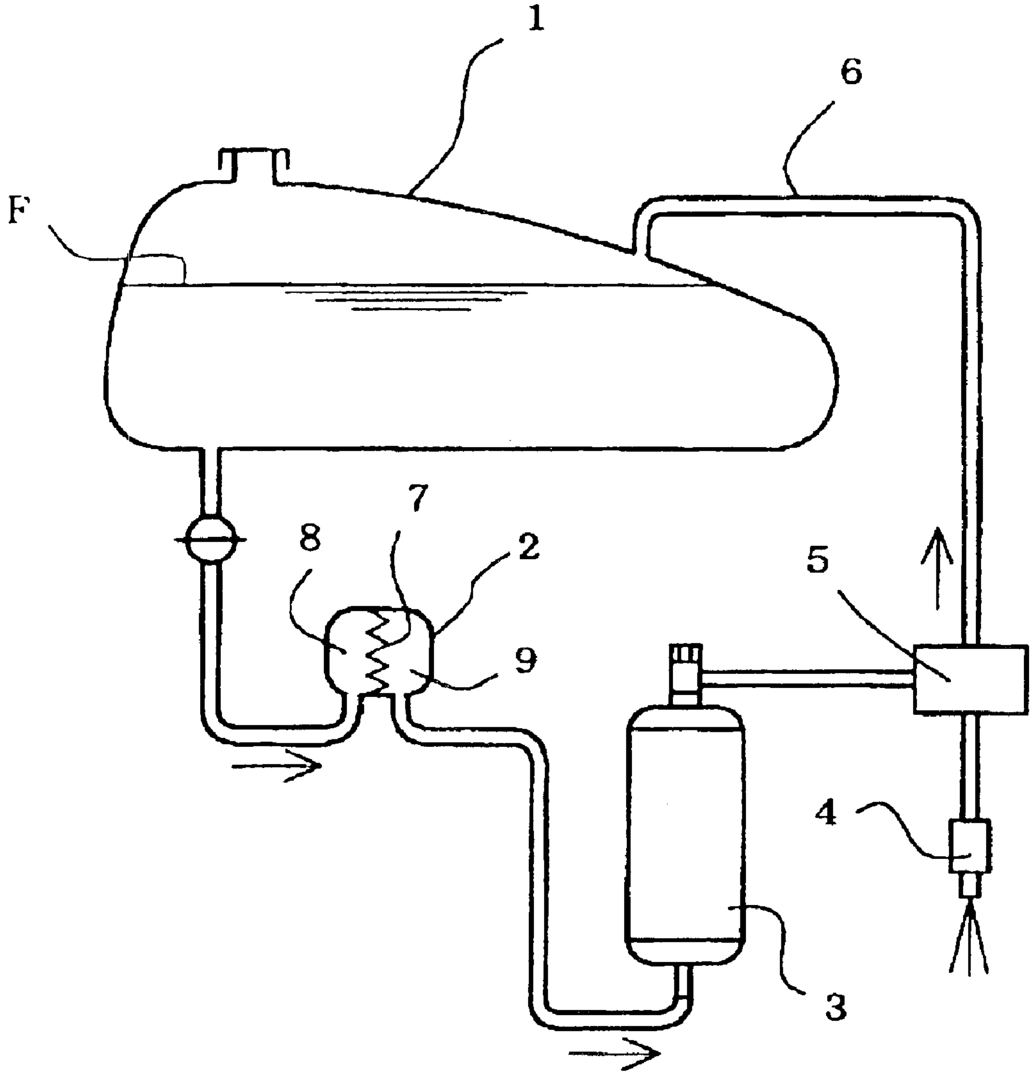
FIG. 8 PRIOR ART
FIG. 8 is a prior art system schematic.

Here, as shown in FIG. 7, the return joint 16*d* itself is disposed to form the angle with the venting pipe upwardly acute, so that the return pipe can be connected as abovementioned.

In this structure, the angle which the excess fuel F and the vapor B flowfrom the return pipe 21 forms with the flow direction of the venting pipe 15, so that the entangling force by the excess fuel to the vapor B from the downstream chamber 14 is increased, and the removing capability of the vapor B is increased.

INDUSTRIAL APPLICABILITY

With the fuel supply device and the fuel filter utilized for this fuel supply device of the present invention, vapor generated at the upstream of a fuel pump can be discharged to a fuel tank through a venting pipe, so that the amount of vapor sucked to the fuel pump is greatly reduced and the degradation of the feeding capacity of the fuel pump can be prevented.

What is claimed is:

1. A fuel filter which is utilized for a fuel supply device to pressurize and supply fuel stored in a fuel tank, wherein said fuel supply device comprises a fuel supply pipe that forms a supply passage for the fuel, a fuel filter to filter the fuel disposed at a midway point of said fuel supply pipe and below said fuel tank, a fuel pump to pressure-feed the fuel disposed at a downstream side of said fuel filter, and a venting pipe to connect the downstream side of said fuel filter and an upper air-space of said fuel tank, comprising:

a fuel filter main body;

a filter member which divides an inside of said filter main body into an upstream chamber and a downstream chamber;

a suction joint to communicate with said fuel tank, which is disposed at the upstream chamber of said fuel filter main body;

a supply joint to communicate with said fuel pump, which is disposed at a lower part of the downstream chamber of said fuel filter main body; and a circulating joint to communicate with an upper air-space of said fuel tank, which is disposed at the upper part of the downstream chamber of said fuel filter.

2. The fuel filter according to claim 1, wherein a return joint, to which a return pipe of a pressure regulator to adjust the pressure of the fuel discharged from said fuel pump is connected, is disposed at said circulating joint.

3. The fuel filter according to claim 2, wherein said return joint is connected to said circulating joint so that the angle which said return joint forms with said circulating joint is upwardly acute.

* * * * *